United States Patent
Micciancio et al.

(10) Patent No.: US 12,170,718 B2
(45) Date of Patent: Dec. 17, 2024

(54) LARGE-PRECISION HOMOMORPHIC COMPARISON USING BOOTSTRAPPING

(71) Applicant: Duality Technologies, Inc., Maplewood, NJ (US)

(72) Inventors: Daniele Micciancio, San Diego, CA (US); Yuriy Polyakov, Fair Lawn, NJ (US); Zeyu Liu, Long Island City, NY (US)

(73) Assignee: Duality Technologies, Inc., Maplewood, NJ (US)

( * ) Notice: Subject to any disclaimer, the term of this patent is extended or adjusted under 35 U.S.C. 154(b) by 286 days.

(21) Appl. No.: 17/958,590

(22) Filed: Oct. 3, 2022

(65) Prior Publication Data

US 2023/0119749 A1 Apr. 20, 2023

Related U.S. Application Data

(60) Provisional application No. 63/251,276, filed on Oct. 1, 2021.

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC ...... H04L 9/008; H04L 9/0618; H04L 9/3093
See application file for complete search history.

(56) References Cited

U.S. PATENT DOCUMENTS

| | | | |
|---|---|---|---|
| 8,972,742 B2* | 3/2015 | Troncoso Pastoriza | ..................... H04L 63/0861 713/186 |
| 12,099,997 B1* | 9/2024 | Hoffberg | .............. G06Q 20/065 |
| 2013/0170640 A1* | 7/2013 | Gentry | .................... H04L 9/008 380/30 |
| 2013/0329883 A1* | 12/2013 | Tamayo-Rios | .......... H04L 9/008 380/28 |

(Continued)

FOREIGN PATENT DOCUMENTS

CN 107124616 A * 9/2017 ............. G06F 21/16

OTHER PUBLICATIONS

I. Chillotti, N. Gama, M. Georgieva, and M. Izabachene. Faster fully homomorphic encryption: Bootstrapping in less than 0.1 seconds. In J. H. Cheon and T. Takagi, editors, Advances in Cryptology—Asiacrypt 2016, pp. 3-33, Berlin, Heidelberg, 2016. Springer Berlin Heidelberg.

(Continued)

*Primary Examiner* — John B King
(74) *Attorney, Agent, or Firm* — PEARL COHEN ZEDEK LATZER BARATZ LLP (57) ABSTRACT

Systems and methods for improving homomorphic encryption are provided. A processor receives an encrypted ciphertext; splits the encrypted ciphertext into a plurality of smaller digits; applies a homomorphic floor function to clear a least significant bit from a current smaller digit; scales down the encrypted ciphertext, using modulus switching, thereby changing the ciphertext modulus to a new modulus; applies a bootstrapping procedure for a sign evaluation function to determine a sign of the scaled down encrypted ciphertext; and transmits the sign with the ciphertext to a server for subsequent use.

18 Claims, 5 Drawing Sheets

(56) References Cited

U.S. PATENT DOCUMENTS

| | | | | |
|---|---|---|---|---|
| 2014/0177828 | A1* | 6/2014 | Loftus | H04L 9/0852 380/44 |
| 2015/0312031 | A1* | 10/2015 | Seo | H04L 9/008 380/28 |
| 2016/0119119 | A1* | 4/2016 | Calapodescu | G06F 21/6227 380/30 |
| 2017/0180115 | A1* | 6/2017 | Laine | H04L 9/0618 |
| 2018/0276417 | A1* | 9/2018 | Cerezo Sanchez | H04L 9/008 |
| 2018/0359079 | A1* | 12/2018 | Hu | H04L 9/008 |
| 2018/0367294 | A1* | 12/2018 | Hu | G06F 21/6227 |
| 2021/0359846 | A1* | 11/2021 | Wright | H04L 9/0643 |
| 2022/0100889 | A1* | 3/2022 | Tan | G06F 21/6245 |
| 2024/0113729 | A1* | 4/2024 | Cooper | H03M 7/4056 |

OTHER PUBLICATIONS

L. Ducas and D. Micciancio. FHEW: Bootstrapping Homomorphic Encryption in Less Than a Second. In E. Oswald and M. Fischlin, editors, Advances in Cryptology—Eurocrypt 2015, pp. 617-640, Berlin, Heidelberg, 2015. Springer Berlin Heidelberg.

D. Micciancio and Y. Polyakov. Bootstrapping in FHEW-like Cryptosystems. Cryptology ePrint Archive, Report 2020/086, 2020. https://eprint.iacr.org/2020/086.

Palisade Lattice Cryptography Library (release 1.11.3). https://palisade-crypto.org/, May 2021.

A. Akavia, M. Leibovich, Y. S. Resheff, R. Ron, M. Shahar, and M. Vald. Privacy-preserving decision tree training and prediction against malicious server. Cryptology ePrint Archive, Report 2019/1282, 2019. https://ia.cr/2019/1282.

M. Albrecht, M. Chase, H. Chen, and et al. Homomorphic encryption security standard. Technical report, HomomorphicEncryption.org, Toronto, Canada, Nov. 2018.

M. R. Albrecht, R. Player, and S. Scott. On the concrete hardness of learning with errors. Journal of Mathematical Cryptology, 9(3):169{203, 2015.

J.-P. Bossuat, C. Mouchet, J. Troncoso-Pastoriza, and J.-P. Hubaux. Efficient bootstrapping for approximate homomorphic encryption with non-sparse keys. Cryptology ePrint Archive, Report 2020/1203, 2020.https://eprint.iacr.org/2020/1203.

Z. Brakerski. Fully homomorphic encryption without modulus switching from classical GapSVP. In Annual Cryptology Conference, pp. 868-886. Springer, 2012.

Z. Brakerski, C. Gentry, and V. Vaikuntanathan. (leveled) fully homomorphic encryption without bootstrapping. ACM Transactions on Computation Theory (TOCT), 6(3):1-36, 2014.

H. Chen, W. Dai, M. Kim, and Y. Song. Efficient homomorphic conversion between (ring) lwe ciphertexts. In K. Sako and N. O. Tippenhauer, editors, Applied Cryptography and Network Security, pp. 460{479, Cham, 2021. Springer International Publishing.

H. Chen, R. Gilad-Bachrach, K. Han, Z. Huang, A. Jalali, K. Laine, and K. Lauter. Logistic regression over encrypted data from fully homomorphic encryption. Cryptology ePrint Archive, Report 2018/462, 2018. https://ia.cr/2018/462.

J. H. Cheon, A. Kim, M. Kim, and Y. Song. Homomorphic encryption for arithmetic of approximate numbers. In International Conference on the Theory and Application of Cryptology and Information Security, pp. 409-437. Springer, 2017.

J. H. Cheon, D. Kim, and D. Kim. Efficient homomorphic comparison methods with optimal complexity. In S. Moriai and H. Wang, editors, Advances in Cryptology—Asiacrypt 2020, pp. 221-256, Cham, 2020. Springer International Publishing.

I. Chillotti, N. Gama, M. Georgieva, and M. Izabach'ene. Faster packed homomorphic operations and efficient circuit bootstrapping for tfhe. In T. Takagi and T. Peyrin, editors, Advances in Cryptology—Asiacrypt 2017, pp. 377-408, Cham, 2017. Springer International Publishing.

I. Chillotti, D. Ligier, J.-B. Orfila, and S. Tap. Improved programmable bootstrapping with larger precision and efficient arithmetic circuits for tfhe. Cryptology ePrint Archive, Report 2021/729, 2021. https://eprint.iacr.org/2021/729.

J. Fan and F. Vercauteren. Somewhat practical fully homomorphic encryption. IACR Cryptol. ePrint Arch., 2012:144, 2012.

N. Genise, D. Micciancio, and Y. Polyakov. Building an efficient lattice gadget toolkit: Subgaussian sampling and more. In Y. Ishai and V. Rijmen, editors, Advances in Cryptology—Eurocrypt 2019, pp. 655-684, Cham, 2019. Springer International Publishing.

A. Guimaraes, E. Borin, and D. F. Aranha. Revisiting the functional bootstrap in tfhe. IACR Transactions on Cryptographic Hardware and Embedded Systems, 2021:229-253, Feb. 2021.

I. lliashenko and V. Zucca. Faster homomorphic comparison operations for bgv and bfv. Proceedings on Privacy Enhancing Technologies, 2021(3):246-264, 2021.

W. jie Lu, Z. Huang, C. Hong, Y. Ma, and H. Qu. Pegasus: Bridging polynomial and nonpolynomial evaluations in homomorphic encryption. SP 2021, 2020. https://eprint.iacr.org/2020/1606.

A. Kim, Y. Polyakov, and V. Zucca. Revisiting homomorphic encryption schemes for finite fields. Cryptology ePrint Archive, Report 2021/204, 2021. https://ia.cr/2021/204.

K. Kluczniak and L. Schild. Fdfb: Full domain functional bootstrapping towards practical fully homomorphic encryption. Cryptology ePrint Archive, Report 2021/1135, 2021. https://ia.cr/2021/1135.

E. Lee, J.-W. Lee, Y.-S. Kim, and J.-S. No. Optimization of homomorphic Comparison algorithm on rns-ckks scheme. Cryptology ePrint Archive, Report 2021/1215, 2021. https://ia.cr/2021/1215.

O. Regev. On lattices, learning with errors, random linear codes, and cryptography. Journal of the ACM (JACM), 56(6):1-40, 2009.

Z. Liu, D. Micciancio, and Y. Polyakov. Large-Precision Homomorphic Sign Evaluation using FHEW/TFHE Bootstrapping, IACR in Asiacrypt 2022 Cryptology ePrint Archive, 2021—eprint.iacr.org, https://ia.cr/2021/1337.

* cited by examiner

```
┌─────────────────────────────────────┐
│ RECEIVING, AT A COMPUTER            │
│ PROCESSOR, AN ENCRYPTED             │  202
│ CIPHERTEXT;                         │
└─────────────────────────────────────┘
                  │
┌─────────────────────────────────────┐
│ SPLITTING, BY THE                   │
│ COMPUTER PROCESSOR,                 │
│ ENCRYPTED CIPHERTEXT INTO A         │  204
│ PLURALITY OF SMALLER DIGITS         │
└─────────────────────────────────────┘
                  │
┌─────────────────────────────────────┐
│ FOR EACH SMALLER DIGIT OF THE       │
│ PLURALITY OF SMALLER DIGITS:        │  206
└─────────────────────────────────────┘
                  │
┌─────────────────────────────────────┐
│ (I) APPLYING, BY THE COMPUTER       │
│ PROCESSOR, A HOMOMORPHIC            │
│ FLOOR FUNCTION TO CLEAR A           │
│ DIGIT OF THE PLURALITY OF           │  208
│ SMALLER DIGITS WHICH                │
│ CORRESPONDS TO A LEAST              │
│ SIGNIFICANT BIT FROM THE            │
│ CURRENT SMALLER DIGIT;              │
└─────────────────────────────────────┘
                  │
┌─────────────────────────────────────┐
│ (ii) RECONSTRUCTING, BY THE         │
│ COMPUTER PROCESSOR, THE             │
│ ENCRYPTED CIPHERTEXT                │
│ WITHOUT THE DIGIT OF THE            │
│ PLURALITY OF SMALLER DIGITS         │  210
│ CLEARED AT (I), AND SCALING         │
│ DOWN THE RECONSTUCTED               │
│ ENCRYPTED CIPHERTEXT, USING         │
│ MODULUS SWITCHING , THEREBY         │
│ CHANGING THE CIPHERTEXT             │
│ MODULUS TO A NEW MODULUS;           │
└─────────────────────────────────────┘
```

LARGE-PRECISION HOMOMORPHIC COMPARISON USING BOOTSTRAPPING

CROSS-REFERENCE TO RELATED APPLICATIONS

This application claims the benefit of and priority to U.S. Provisional Patent Application No. 63/251,276 filed Oct. 1, 2021, which is owned by the assignee of the instant application and incorporated herein by reference in its entirety.

GOVERNMENT LICENSE RIGHTS

This invention was made with government support under Agreement No.: HR00112090102 awarded by the Defense Advanced Research Projects Agency (DARPA). The government has certain rights in the invention.

FIELD OF THE INVENTION

The invention relates generally to improving homomorphic encryption. In particular, improving comparisons between two homomorphically encrypted ciphertexts by, for example, determining a sign of at least one of the homomorphically encrypted ciphertexts.

BACKGROUND

Homomorphic encryption (HE) can allow many computations to be performed securely over encrypted data, without decrypting and/or exposing the underlying data. However, computations performed over HE data can be significantly more complex and time-consuming than, for example, their plaintext counterparts. In particular many HE schemes fail to support certain operations. A comparison of two encrypted numbers can be an important operation in many machine learning applications, for example, decision tree and/or neural network inference/training. An efficient instantiation of comparison operations in the context of fully homomorphic encryption (FHE) can be challenging, for example, especially when a relatively high precision (e.g., more than 5 bits) is sought. Typically, the conventional FHE way of evaluating the comparison operation, which is typically based on the sign function evaluation using FHEW/TFHE bootstrapping, can only usually support very small precision (e.g., limited to 5 bits or less). For a higher precision, the runtime complexity can scale linearly with the ciphertext and plaintext modulus. Accordingly, it can be desirable for homomorphic comparisons that can scale logarithmically with the ciphertext and plaintext modulus, to support a large-precision comparison.

SUMMARY

Advantages of the invention can include increasing precision (e.g., an accuracy) of computations over homomorphically encrypted data. Advantages of the invention can also include increased data security due to, for example, being able to keep the data encrypted while performing the comparison.

According to one or more embodiments, there is provided a computer implemented method for improving homomorphic encryption, the method including: receiving, at a computer processor, an encrypted ciphertext; splitting, by the computer processor, the encrypted ciphertext into a plurality of smaller digits; for each smaller digit of the plurality of smaller digits: (i) applying, by the computer processor, a homomorphic floor function to clear a digit of the plurality of smaller digits which corresponds to a least significant bit of the encrypted ciphertext; (ii) reconstructing, by the computer processor, the encrypted ciphertext without the digit of the plurality of smaller digits cleared at (i), and scaling down the reconstructed encrypted ciphertext using modulus switching, thereby changing the ciphertext modulus to a new modulus; iteratively repeating steps (i) and (ii) until the new modulus is less than or equal to the modulus of the smaller digit under consideration; applying, by the processor, a bootstrapping procedure for a sign evaluation function to determine a sign of the scaled down encrypted ciphertext; and transmitting, by the computer processor, the sign with the ciphertext to a server for subsequent use.

According to some embodiments, the homomorphic floor function is a negacyclic function.

According to some embodiments, the method includes comparing two homomorphically encrypted ciphertexts by evaluating a difference between said two homomorphically encrypted ciphertexts, and determining a sign of the difference.

According to some embodiments, applying the homomorphic floor function includes using a function $f_0(x)$, given by $$f_0(x) = \begin{cases} -q/4, & \text{if } 0 \le x < q/2 \\ q/4, & \text{otherwise.} \end{cases}$$

According to some embodiments, applying the homomorphic floor function includes using a function $f_1(x)$, given by $$f_1(x) = \begin{cases} x, & \text{if } x < q/2 \\ q/2 - x, & \text{otherwise.} \end{cases}$$

According to some embodiments, applying the homomorphic floor function includes using a function $f_2(x)$, given by $$f_2(x) = \begin{cases} -q/4, & \text{if } 0 \le x < q/2 \\ q/4, & \text{if } q/2 \le x < 3q/4 \\ 0, & \text{otherwise.} \end{cases}$$

According to some embodiments, the step of applying the homomorphic floor function is replaced by an arbitrary function evaluation using a lookup table for small plaintext moduli which support FHEW bootstrapping.

According to some embodiments, the subsequent use includes applying the transmitted sign and ciphertext to a machine learning decision tree action or neural network inference.

According to some embodiments, the encrypted ciphertext corresponds to an integer modulo $Q/\alpha$, and wherein a noise e of the encrypted ciphertext is constrained such that $|e| < \beta$, wherein $\beta \le \alpha/4$.

According to one or more embodiments there is provided a system for improving homomorphic encryption, the system including at least one processor and a memory containing instructions which, when executed by the at least one processor, cause the at least one processor to: receive an encrypted ciphertext; split the encrypted ciphertext into a plurality of smaller digits; for each smaller digit of the plurality of smaller digits: (i) apply a homomorphic floor function to clear a digit of the plurality of smaller digits which corresponds to a least significant bit of the encrypted ciphertext; (ii) reconstruct the encrypted ciphertext without the digit of the plurality of smaller digits cleared at (i), and scale down the reconstructed encrypted ciphertext, using modulus switching, thereby changing the ciphertext modulus to a new modulus; iteratively repeat steps (i) and (ii) until the new modulus is less than or equal to the modulus of the smaller digit under consideration; apply a bootstrapping procedure for a sign evaluation function to determine a sign of the scaled down encrypted ciphertext; and transmit the sign with the ciphertext to a server for subsequent use.

According to some embodiments, the homomorphic floor function is a negacyclic function.

According to some embodiments, the at least one processor is configured to compare two homomorphically encrypted ciphertexts by evaluating a difference between said two homomorphically encrypted ciphertexts, and determining a sign of the difference.

According to some embodiments, applying the homomorphic floor function includes using a function $f_0(x)$, given by $$f_0(x) = \begin{cases} -q/4, & \text{if } 0 \le x < q/2 \\ q/4, & \text{otherwise.} \end{cases}$$

According to some embodiments, applying the homomorphic floor function includes using a function $f_1(x)$, given by $$f_1(x) = \begin{cases} x, & \text{if } x < q/2 \\ q/2 - x, & \text{otherwise.} \end{cases}$$

According to some embodiments, applying the homomorphic floor function includes using a function $f_2(x)$, given by $$f_2(x) = \begin{cases} -q/4, & \text{if } 0 \le x < q/2 \\ q/4, & \text{if } q/2 \le x < 3q/4 \\ 0, & \text{otherwise.} \end{cases}$$

According to some embodiments, the step of applying the homomorphic floor function is replaced by an arbitrary function evaluation using a lookup table for small plaintext moduli which support FHEW bootstrapping.

According to some embodiments, the subsequent use includes applying the transmitted sign and ciphertext to a machine learning decision tree action or neural network inference.

According to some embodiments, the encrypted ciphertext corresponds to an integer modulo $Q/\alpha$, and wherein a noise e of the encrypted ciphertext is constrained such that $|e|<\beta$, wherein $\beta \le \alpha/4$.

According to some embodiments, the at least one processor belongs to the server.

According to one or more embodiments there is provided a computer program product containing instructions which, when loaded into a computing device which includes at least one processor cause the at least one processor to: receive an encrypted ciphertext; split the encrypted ciphertext into a plurality of smaller digits; for each smaller digit of the plurality of smaller digits: (i) apply a homomorphic floor function to clear a digit of the plurality of smaller digits which corresponds to a least significant bit of the encrypted ciphertext; (ii) reconstruct the encrypted ciphertext without the digit of the plurality of smaller digits cleared at (i), and scale down the reconstructed encrypted ciphertext, using modulus switching, thereby changing the ciphertext modulus to a new modulus; iteratively repeat steps (i) and (ii) until the new modulus is less than or equal to the modulus of the smaller digit under consideration; apply a bootstrapping procedure for a sign evaluation function to determine a sign of the scaled down encrypted ciphertext; and transmit the sign with the ciphertext to a server for subsequent use.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanied drawings. Embodiments are illustrated without limitation in the figures, in which like reference numerals indicate corresponding, analogous, or similar elements, and in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In general, the invention may provide an increased precision (e.g., suitable to support typically intense computations, such as training machine learning models on imagery data) for determining the sign (e.g., positive or negative) of a homomorphically encrypted ciphertext. The comparison of two encrypted numbers can be equivalent to computing the difference of the numbers followed by an evaluation of a sign function. Evaluating a sign function on encrypted data can be difficult and can be prone to errors.

Typically, the sign function evaluation can be similar to FHEW/TFHE bootstrapping, in that the most significant bit (MSB) of an encrypted number needs to be found. Hence, one solution to find the sign can be to directly apply FHEW/TFHE bootstrapping. This approach may work for a limited precision (e.g., up to 5 bits) for the parameters typically currently used in the art for efficient Boolean circuit evaluation. The complexity of the FHEW/TFHE bootstrapping procedures can scale linearly with the ciphertext modulus Q. For a procedure that scales linearly, an increase from 5 bits of precision to 10 bits of precision, the runtime may need to increase by a factor of $2^5=32$, as compared to, for example, the current results for Boolean arithmetic: Embodiments of the invention may therefore provide over an order of magnitude runtime speed-up as compared to the current state of the art.

The invention can include a system for improving homomorphic encryption, that can allow a sign of a homomorphically encrypted ciphertext to be determined. The system may include a computing device, for example as described in FIGS. 3A and 3B, described in further detail below. The system may include at least one processor (e.g., controller 105A of FIG. 3A) and a memory (e.g., memory 120A of FIG. 3A) containing instructions which, when executed by the at least one processor, cause the at least one processor to receive an encrypted ciphertext.

The encrypted ciphertext may be encrypted using homomorphic encryption schemes known in the art, e.g., FHEW, TFHE, and Cheon-Kim-Kim-Song (CKKS). The encrypted ciphertext may be an encryption of a plaintext message m, which may be a numerical value $m \in Z$, for example, a signed integer, or a fractional number in fixed-point, binary, two's complement representation. According to some embodiments, the encrypted ciphertext is a learning with errors (LWE) ciphertext, e.g., a vector of elements in $Z_Q$. The (plaintext) message m may be an integer modulo $Q/\alpha$. In some embodiments, $\alpha = 2^l$ and $Q = 2^h$ are powers of 2, and the message m is interpreted as a (h-l)-bit integer.

In some embodiments, the encryption of the most significant bit of m, e.g., $[m/2^{h-l-1}]$ is determined. If $m \in Z_{2h-l}$ is the standard (e.g., two's complement) representation of a signed integer, this bit is the sign of m. In other words, it equals 1 if and only if m represents a negative number.

According to some embodiments, the encrypted ciphertext (e.g., homomorphically encrypted value) is an integer modulo $Q/\alpha$, and a noise e of the encrypted ciphertext is constrained such that $|e| < \beta$, wherein $\beta \leq \alpha/4$.

Figure 1:
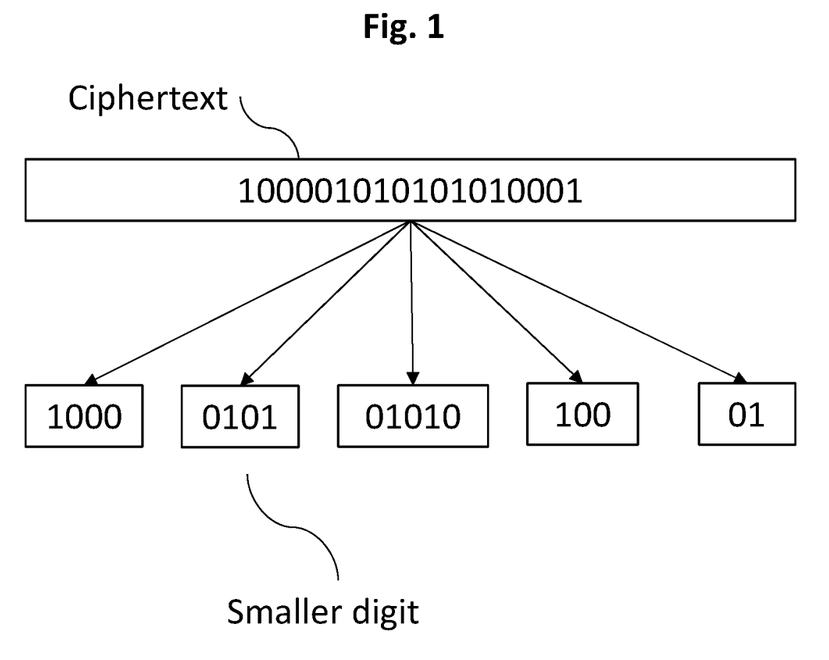
FIG. 1 is a diagram showing a representation of splitting an encrypted ciphertext, according to some embodiments of the invention.

According to some embodiments, the at least one processor (e.g., controller 105A as described below in FIG. 3A) splits the encrypted ciphertext into a plurality of smaller digits. For example, embodiments of the invention may split the encrypted ciphertext (e.g., the ciphertext modulo Q) into multiple digits. For example, FIG. 1 shows an encrypted ciphertext {1000010101010100001} that is split into a plurality of smaller digits {1000}, {0101}, {01010}, {100}, and {01}. The at least one processor may work with a smaller modulus q (e.g., smaller than Q) when performing operations on the plurality of smaller digits, which may allow the use of FHEW bootstrapping without, for example, causing the linear scaling described above. In some embodiments, the at least one processor may send the plurality of smaller digits to a corresponding plurality of other processors each working internally with a much smaller modulus q for the plurality of split multiple digits. This may reduce a total time taken to perform operations on all of the plurality of smaller digits, due to parallel processing. It should be noted that the smaller modulus q may be the same for each of the plurality of smaller digits, or may be different for at least one of the smaller digits (e.g., a first modulus $q_1$, a second modulus $q_2$, etc.).

According to some embodiments, the at least one processor (e.g., controller 105A as described below in FIG. 3A) iterates over each of the smaller digits, performing operations described below on each smaller digit of the plurality of smaller digits. In some embodiments, the plurality of smaller digits may be operated on in parallel by multiple processors.

According to some embodiments, for each smaller digit of the plurality of digits, the at least one processor (i) applies a homomorphic floor function to clear the digit of the plurality of smaller digits that corresponds to the least significant bit of the encrypted ciphertext, and (ii) reconstructs the encrypted ciphertext without the digit of the plurality of smaller digits cleared at (i) and scales down the encrypted ciphertext, using modulus switching, thereby changing the ciphertext modulus to a new modulus.

According to some embodiments, the homomorphic floor function is a negacyclic function. As used herein, a negacyclic function may be a function $f: Z_Q \rightarrow Z$ satisfying $f(x+Q/2) = -f(x)$.

Embodiments of the invention may treat FHEW/TFHE bootstrapping as a black box (e.g., using the typical TFHE/FHEW design, without any modifications, implemented as software and/or hardware), implying that any of the standard bootstrapping functions can be used interchangeably. As used herein, this bootstrapping may be referred to as FHEW bootstrapping or Boot[$f$].

According to some embodiments, applying the homomorphic floor function includes using (e.g., by the at least one processor) a function $f_0(x)$, given by $$f_0(x) = \begin{cases} -q/4, & \text{if } 0 \leq x < q/2 \\ q/4, & \text{otherwise.} \end{cases} \quad \text{EQN. 1}$$

According to some embodiments, applying the homomorphic floor function (e.g., by the at least one processor) includes using a function $f_1(x)$, given by $$f_1(x) = \begin{cases} x, & \text{if } x < q/2 \\ q/2 - x, & \text{otherwise.} \end{cases} \quad \text{EQN. 2}$$

According to some embodiments, applying the homomorphic floor function (e.g., by the at least one processor) includes using a function $f_2(x)$, given by $$f_2(x) = \begin{cases} -q/4, & \text{if } 0 \leq x < q/2 \\ q/4, & \text{if } q/2 \leq x < 3q/4 \\ 0, & \text{otherwise.} \end{cases} \quad \text{EQN. 3}$$

It will be appreciated that the expressions given by EQNs. 1-3 are negacyclic functions.

According to some embodiments, once the current least significant digit is cleared (e.g., using a homomorphic floor function) the ciphertext is scaled down (e.g., in step (ii)) by the at least one processor using modulus switching from Q to $\alpha$ Q/q.

According to some embodiments, the at least one processor iteratively repeat steps (i) and (ii) until the new modulus is less than or equal to the modulus of the smaller digit under consideration. For example, the iterative procedure may be repeated until Q becomes less than or equal to q.

According to some embodiments, the at least one processor applies a bootstrapping procedure for a sign evaluation function to determine a sign of the scaled down encrypted ciphertext (e.g., successively scaled down until Q becomes less than or equal to q). FHEW can support functional bootstrapping for negacyclic functions. If $\alpha/2$ is added to the LWE encrypted ciphertext to yield a modified message $m' = am + e + \alpha/2$, where e is the noise, a sign function $\gamma(x)$ can be used directly to evaluate the sign of the encrypted ciphertext. The sign function $\gamma(x)$ may be defined as a function γ: $Z_Q \to \{-1, +1\}$ mapping $\gamma(x) = +1$ for $x \in \{0, \ldots, Q/2-1\}$, and $\gamma(x) = -1$ for $x \in \{-Q/2, \ldots, -1\}$.

According to some embodiments, the at least one processor transmits the sign with the ciphertext to a server for subsequent use. For example, the at least one processor may assign, associate, or otherwise correlate the ciphertext's sign with the ciphertext, and transmit these two pieces of information. In some embodiments the sign and the ciphertext are transmitted together as a single data packet.

According to some embodiments, the at least one processor is part of the same server to which the sign and ciphertext are transmitted. In other words, the at last one processor and the server may be part of the same computing device.

According to some embodiments, the at least one processor compares two homomorphically encrypted ciphertexts by evaluating a difference between said two homomorphically encrypted ciphertexts and determining a sign of the difference. It should be noted that whilst the FHEW bootstrapping procedure for the evaluation function γ can be directly applied (it is easy to observe that γ is already negacyclic), the problem is that the complexity of the FHEW bootstrapping procedure (in particular, the size of the FHEW accumulators) is linear in the ciphertext modulus Q. So, while conceptually the sign computation can be performed directly using the FHEW procedure (e.g., without splitting the ciphertext, applying a floor function, or scaling down), such an approach can be inefficient, both in theory (exponential in the bit size of the input) and in practice. Hence, embodiments of the invention split the ciphertext into smaller digits and use an iterative process of clearing the least significant bit and rescaling before applying the sign evaluation function.

According to some embodiments, the subsequent use (e.g., of the {sign, ciphertext} pair) includes applying the transmitted sign and ciphertext to a machine learning decision tree action or neural network inference. For example, a machine learning algorithm may take a decision by comparing two encrypted values, and the comparison may be evaluated using the at least one processor to determine the sign of a difference of the two values. Embodiments of the invention may therefore allow for machine learning techniques and neural networks to be applied in the setting of encrypted data, without the need for decryption in order for the machine learning/neural network techniques to understand the data, thereby preventing leaking of sensitive information.

According to one or more embodiments of the invention, there is provided a computer implemented method for improving homomorphic encryption, for example by computing the sign of an encrypted value using bootstrapping techniques.

Figure 2:
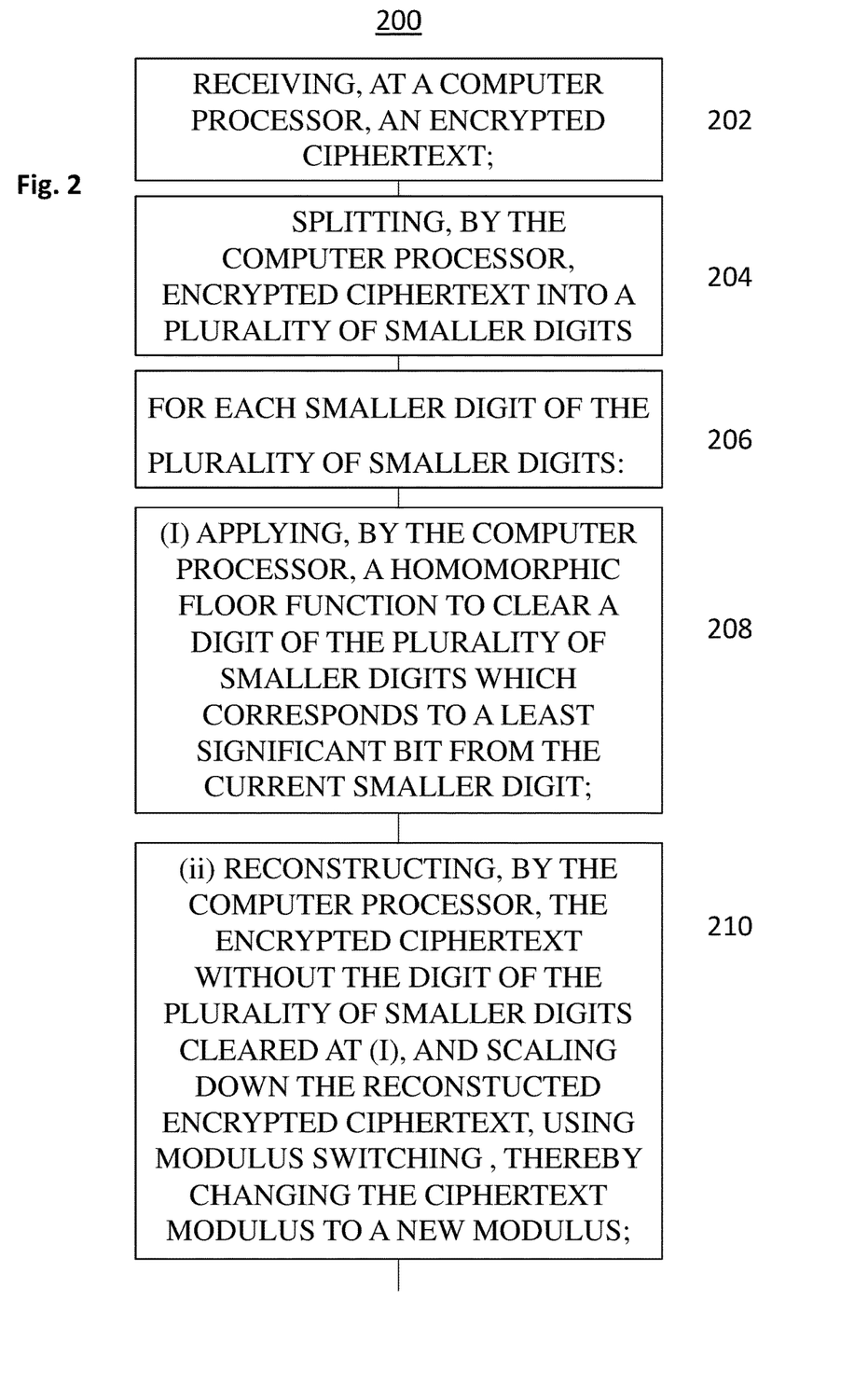
FIG. 2 shows a flowchart of a method for improving homomorphic encryption, according to some embodiments of the invention.

FIG. 2 is a flow chart of a method 200 for improving homomorphic encryption, according to some embodiments of the invention. Method 200 may be a computer implemented method implemented on a computing device such as described in FIGS. 3A and 3B herein.

Method 200 may include receiving, at a computer processor (e.g., controller 105A, as described below in FIG. 3A), an encrypted ciphertext (Step 202). The ciphertext may be encrypted using homomorphic encryption schemes known in the art, e.g., Cheon-Kim-Kim-Song (CKKS) homomorphic encryption. The encrypted ciphertext may be an encryption of a numerical value $m \in Z$, for example, a signed integer, or a fractional number in fixed-point, binary, two's complement representation.

According to some embodiments, the encrypted ciphertext (e.g., homomorphically encrypted value) is an integer modulo $Q/\alpha$, and a noise e of the encrypted ciphertext is constrained such that $|e|<\beta$, wherein $\beta \le \alpha/4$.

Method 200 may include splitting, by the computer processor (e.g., controller 105A, as described below in FIG. 3A), the encrypted ciphertext into a plurality of smaller digits (Step 204). For example, and as described with respect to FIG. 1, embodiments of the invention may split the ciphertext (e.g., the ciphertext modulo Q) into multiple digits. The at least one processor may work with a smaller modulus q (e.g., smaller than Q) when performing operations on the plurality of smaller digits, which may allow the use of FHEW bootstrapping without, for example, causing the linear scaling described above. In some embodiments, the at least one processor may send the plurality of smaller digits to a corresponding plurality of other processors each working internally with a much smaller modulus q for the plurality of split multiple digits. This may reduce a total time taken to perform operations on all of the plurality of smaller digits, due to parallel processing. It should be noted that the smaller modulus q may be the same for each of the plurality of smaller digits, or may be different for at least one of the smaller digits (e.g., a first modulus $q_1$, a second modulus $q_2$, etc.).

Method 200 may include iterating over each of the smaller digits performing operations described below on each smaller digit of the plurality of smaller digits (Step 206).

As part of the iteration, method 200 may include: (i) applying, by the computer processor (e.g., controller 105A, as described below in FIG. 3A), a homomorphic floor function to clear a least significant bit from the current smaller digit (Step 208). According to some embodiments, the homomorphic floor function is a negacyclic function.

According to some embodiments, applying the homomorphic floor function (Step 208) includes using the function $f_0(x)$ given by EQN. 1. According to some embodiments, applying the homomorphic floor function (Step 208) includes using the function $f_1(x)$ given by EQN. 2. According to some embodiments, applying the homomorphic floor function (Step 208) includes using the function $f_2(x)$ given by EQN. 3.

As part of the iteration, method 200 may include: (ii) reconstructing, by the computer processor (e.g., controller 105A, as described below in FIG. 3A), the encrypted ciphertext without the digit of the plurality of smaller digits cleared at (i), and scaling down the reconstructed encrypted ciphertext, using modulus switching, thereby changing the ciphertext modulus to a new modulus (Step 210). In other words, once the current least significant digit is cleared the ciphertext may be put back together from the plurality of smaller digits, less the smaller digit which was cleared by the homomorphic floor function, and then scaled down using modulus switching (for example from Q to α Q/q).

Method 200 may include iteratively repeating steps (i) (e.g., Step 208) and (ii) (e.g., Step 210) until the new modulus is less than or equal to the modulus of the smaller digit under consideration (Step 212). For example, the iterative procedure (e.g., Step 208) may be repeated until Q becomes less than or equal to q.

Method 200 may include applying, by the computer processor (e.g., controller 105A, as described below in FIG. 3A), a bootstrapping procedure for a sign evaluation function to determine a sign of the scaled down encrypted ciphertext (Step 214). For example, efficient FHEW bootstrapping for a function $\gamma(x)$ can be used directly to evaluate the sign function. The sign function $\gamma(x)$ may be defined as a function $\gamma: Z_Q \to \{-1, +1\}$ mapping $\gamma(x) = +1$ for $x \in \{0, \ldots, Q/2-1\}$, and $\gamma(x) = -1$ for $x \in \{-Q/2, \ldots, -1\}$.

Method 200 may include transmitting, by the computer processor (e.g., controller 105A, as described below in FIG. 3A), the sign with the ciphertext to a server for subsequent use (Step 216). For example, the computer processor may assign, associate, or otherwise correlate the sign of the ciphertext with the ciphertext, and transmit these two pieces of information. In some embodiments the sign and the ciphertext are transmitted together as a single data packet.

According to some embodiments, the processor on which method 200 is performed is part of the server. In other words, the processor and the server may be part of the same computing device (e.g., device 110, 115, 140, and/or 150, as shown in FIG. 3B).

According to some embodiments, method 200 includes comparing two homomorphically encrypted ciphertexts by evaluating a difference between said two homomorphically encrypted ciphertexts and determining a sign of the difference. The sign may be determined according to Steps 202-216.

According to some embodiments, the subsequent use includes applying the transmitted sign and ciphertext to a machine learning decision tree action and/or neural network inference. For example, a machine learning algorithm may take a decision by comparing two encrypted values, and the comparison may be evaluated using method 200 to determine the sign of a difference of the two values.

Table 1 shows pseudocode for a homomorphic sign computation, according to some embodiments of the invention. Embodiments of the invention may use same or similar pseudocode shown in Table 1 as part of a comparison between two encrypted ciphertexts.

Conceptually, the pseudocode in Table 1 may correspond to the notion of long division. The main challenge in this long division algorithm is associated with evaluating the floor function, which is not negacyclic and hence cannot typically be directly evaluated using FHEW bootstrapping. In the pseudocode of Table 1, embodiments of the invention may use the two example negacyclic evaluation functions given in EQNs. 1 and 2 herein.

In the pseudocode of Table 1, the ciphertexts may be LWE ciphertexts defined as $(c,d) \in Z_Q^{n+1}$ for a (large, e.g., more than 64 bits) ciphertext modulus Q and plaintext modulus $Q/\alpha$. The running time of the HomSign procedure in Table 1 may be proportional, for example, to $\log Q / \log(Q/\alpha)$.

TABLE 1

| Algorithm 1 lgorithm for Homomorphic Sign Computation |  |
|---|---|
| 1: | procedure HomFloor(Q,(c,d)) |
| 2: | d ← d + β |
| 3: | (a,b) ← (c,d) mod q |
| 4: | (c,d) ← (c,d) − Boot[f$_0$](a,b) (mod Q) |
| 5: | $d \leftarrow d + \beta - \frac{q}{4}$ |
| 6: | (a,b) ← (c,d) mod q |
| 7: | (c,d) ← (c,d) − Boot[f$_1$](a,b) (mod Q) |
| 8: | return (c,d) |
| 9: | end procedure |
| 10: | procedure HomSign(Q,(c,d)) |
| 11: | while Q > q do |
| 12: | (c,d) ← HomFloor(Q,(c,d)) |
| 13: | $(c, d) \leftarrow \left\lceil \frac{a}{q} \cdot (c, d) \right\rfloor$ |

TABLE 1-continued

| Algorithm 1 lgorithm for Homomorphic Sign Computation |  |
|---|---|
| 14: | Q ← αQ/q |
| 15: | end while |
| 16: | d ← d + β |
| 17: | (a,b) ← (q/Q) · (c,d) |
| 18: | (c,d) ← (−Boot[f$_0$](a,b)) (mod Q) |
| 19: | return (c,d) |
| 20: | end procedure |

Embodiments of the invention may use the HomFloor procedure in Table 1 to evaluate the $f_0(x)$ function given in EQN. 1 herein to clear the most significant bit (MSB) of each digit (e.g., first bootstrapping) and then subtract the remaining bits in the digit using a second invocation of FHEW bootstrapping (e.g., for function $f_1(x)$, given in EQN. 2 herein). Both of these evaluation functions are negacyclic, thus allowing the use of FHEW bootstrapping. The pseudocode of Table 1 can introduce a constraint for the input ciphertext noise: $|e| \leq \beta$, where $\beta \leq \alpha/4$. The floor function in Table 1 (e.g., the HomFloor procedure) may clear up to $Q/\alpha$ bits. Since the running time of HomSign is proportional to $\log Q/\log(Q/\alpha)$, embodiments may set a to the smallest possible value, e.g., $\alpha = 4\beta$.

Table 2 shows pseudocode for an alternative floor function procedure, HomFloorAlt.

TABLE 2

| Algorithm 2 Alternative Algorithm for Homomorphic Sign Computation |  |
|---|---|
| 1: | procedure HomFloorAlt(Q,(c,d)) |
| 2: | (a,b) ← (c,d) mod q |
| 3: | (c,d) ← (c,d) − Boot[f$_2$](a,b) (mod Q) |
| 4: | $d \leftarrow d + \beta - \frac{q}{4}$ |
| 5: | (a,b) ← (c,d) mod q |
| 6: | (c,d) ← (c,d) − Boot[f$_0$](a,b) (mod Q) |
| 7: | $d \leftarrow d + \beta - \frac{q}{4}$ |
| 8: | (a,b) ← (c,d) mod q |
| 9: | (c,d) ← (c,d) − Boot[f$_1$](a,b) (mod Q) |
| 10: | return (c,d) |
| 11: | end procedure |

The procedure of Table 2 does not have the input noise constraint present in Table 1 but may use an extra invocation of FHEW bootstrapping. The first invocation of FHEW bootstrapping may be used to clear the second-most significant bit in the digit. Another invocation of FHEW bootstrapping may clear the MSB, and, finally, the remaining bits in the digit may be cleared using the third invocation of FHEW bootstrapping. In other words, one difference between the two floor function algorithms of Table 1 and Table 2 can be in the first bootstrapping operation, which clears the second-most significant bit. The alternative floor function evaluation algorithm may gain one extra bit of precision compared to the first algorithm but can have a cost of an additional invocation of FHEW bootstrapping. To clear the second-most significant bit, some embodiments of the invention may use the negacyclic evaluation function $f_2(x)$ given by EQN. 3 herein.

According to some embodiments, the step of applying the homomorphic floor function (Step 208) is replaced by an arbitrary function evaluation using a lookup table for small plaintext moduli which support FHEW bootstrapping. Table 3 shows pseudocode for such a procedure.

TABLE 3

Algorithm 3 Algorithm for Arbitrary Function Evaluation

Auxiliary math functions $f_0$: $\mathbb{Z}_{2q} \to \mathbb{Z}_{2q}$ $$f_0'(x) = \left(q\left\lfloor\frac{x}{q}\right\rfloor - \frac{q}{2}\right) \bmod 2q$$

1:     procedure EVALFUNC(f: $\mathbb{Z}_{q/\alpha} \to \mathbb{Z}_{Q/\alpha}$, q, Q, α, (c,d))
2:     Let $$f_1'(x) = \begin{cases} \alpha f(\lceil x/\alpha \rceil) & \text{if } x < q \\ -\alpha f(\lceil (2q-x)/\alpha \rceil) & \text{otherwise} \end{cases} \bmod Q$$

3:     d ← d + β
4:     (c,d) ← (c,d) (mod 2q)
5:     (c,d) ← (c,d) − Boot[$f_0$'](c,d) (mod 2q)

6:     $d \leftarrow d + \beta - \frac{q}{2}$

7:     (c,d) ← Boot[$f_1$'](c,d) (mod Q)
8:     return (c,d)
9:     end procedure Embodiments of the invention may use the pseudocode of Table 3 to restrict the ciphertext modulus to a q that supports efficient (e.g., for larger than 64 bits) FHEW bootstrapping. As an example, consider the generalization of the first floor function procedure given as an example in Table 1. Embodiments of the invention may first extend the ciphertext from modulus q to 2q to introduce a random MSB modulo 2q. Then the function $f_0'(x)$ given in Table 3 may be evaluated to clear this MSB. Embodiments of the invention may then invoke the function $f_1'(x)$ given in Table 3 for the remaining bits unaffected by noise.

According to one or more embodiments of the invention, there is provided a computer program product containing instructions which, when loaded into a computing device which includes at least one processor cause the at least one processor to: receive an encrypted ciphertext. The encrypted ciphertext may be encrypted as described herein.

The instructions of the computer program product may cause the at least one processor to split the encrypted ciphertext into a plurality of smaller digits.

For each smaller digit of the plurality of smaller digits, the instructions of the computer program product may cause the at least one processor to apply a homomorphic floor function to clear a least significant bit from the current smaller digit. Applying the homomorphic floor function may include using one or more functions as described herein, for example as given by EQNs. 1-3.

For each smaller digit of the plurality of smaller digits, the instructions of the computer program product may cause the at least one processor to reconstruct the encrypted ciphertext without the digit of the plurality of smaller digits cleared at (i), and scale down the reconstructed encrypted ciphertext, using modulus switching, thereby changing the ciphertext modulus to a new modulus.

The instructions of the computer program product may cause the at least one processor to iteratively repeat steps (i) and (ii) until the new modulus is less than or equal to the modulus of the smaller digit under consideration.

In some embodiments, the instructions of the computer program product cause the at least one processor to apply a bootstrapping procedure for a sign evaluation function to determine a sign of the scaled down encrypted ciphertext. The instructions may cause the at least one processor to transmit the sign with the ciphertext to a server for subsequent use.

Figure 3A:
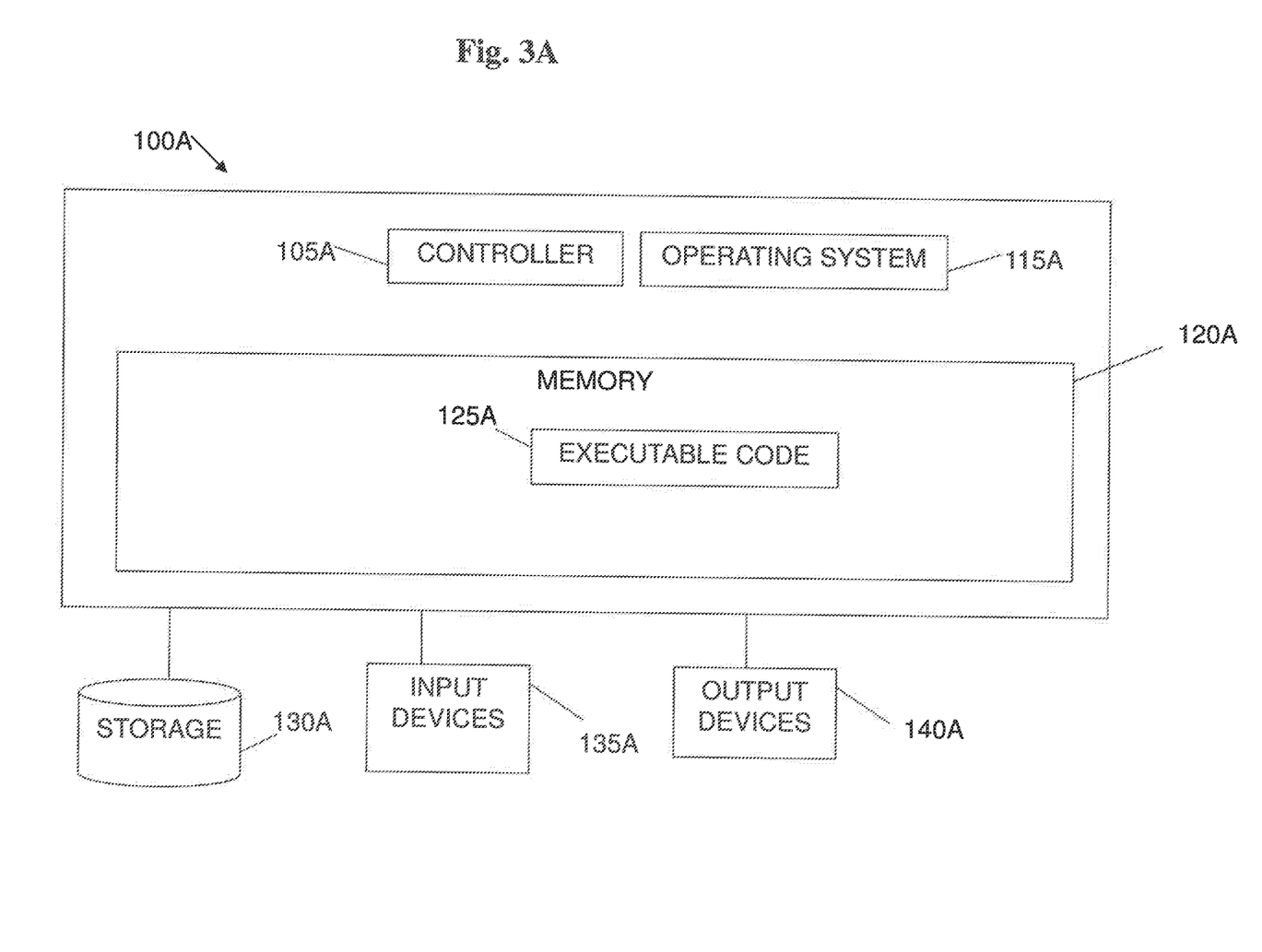
FIG. 3A is a block diagram of an exemplary computing device which may be used with embodiments of the present invention.
Figure 3B:
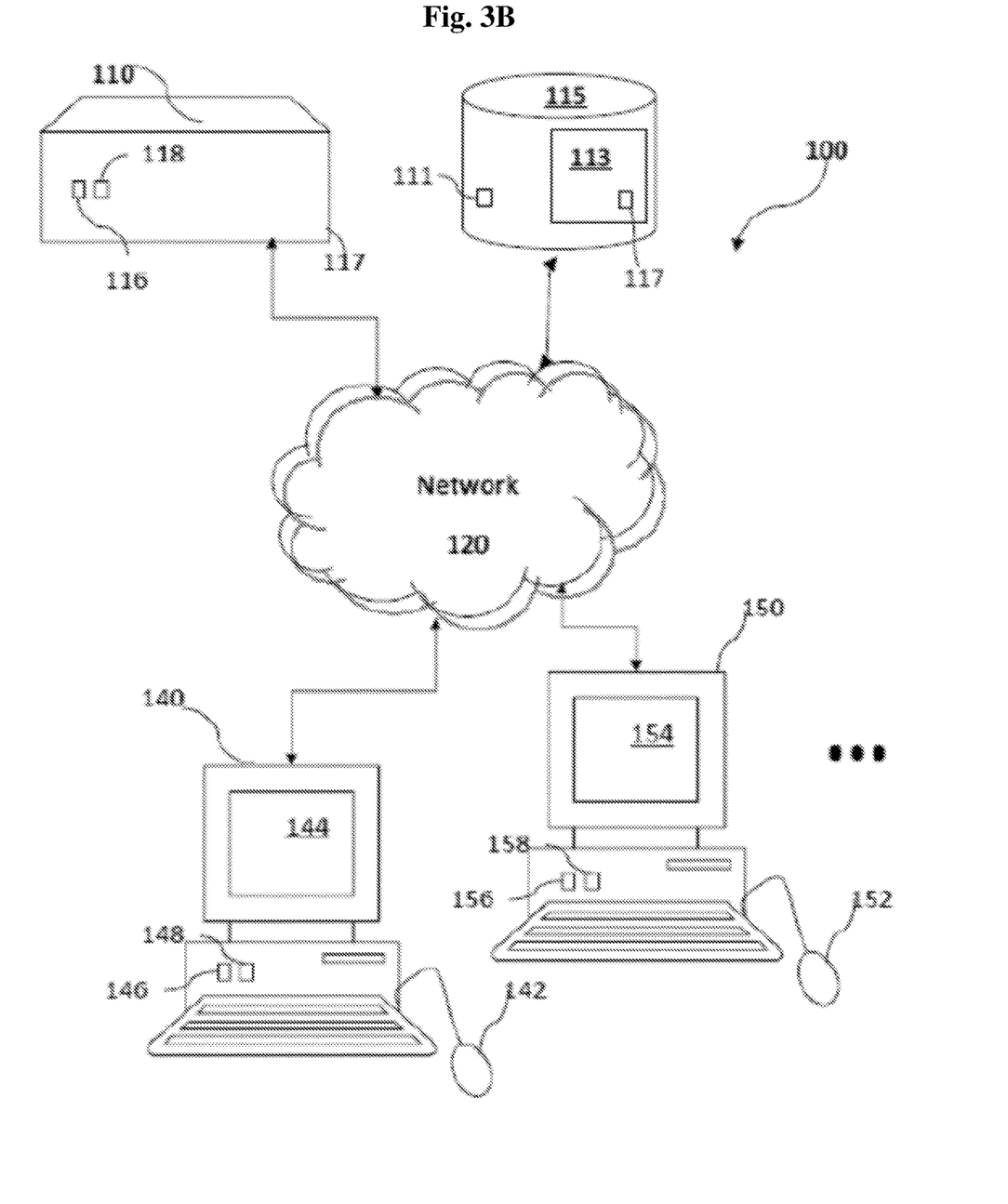
FIG. 3B is schematic drawing of a system, according to some embodiments of the invention.

FIG. 3A shows a block diagram of an exemplary computing device which may be used with embodiments of the present invention. Computing device 100A may include a controller or computer processor 105A that may be, for example, a central processing unit processor (CPU), a chip or any suitable computing device, an operating system 115A, a memory 120A, a storage 130A, input devices 135A and output devices 140A such as a computer display or monitor displaying for example a computer desktop system.

Operating system 115A may be or may include code to perform tasks involving coordination, scheduling, arbitration, or managing operation of computing device 100A, for example, scheduling execution of programs. Memory 120A may be or may include, for example, a random access memory (RAM), a read only memory (ROM), a Flash memory, a volatile or non-volatile memory, or other suitable memory units or storage units. At least a portion of Memory 120A may include data storage housed online on the cloud. Memory 120A may be or may include a plurality of different memory units. Memory 120A may store for example, instructions (e.g., code 125A) to carry out a method as disclosed herein. Memory 120A may use a datastore, such as a database.

Executable code 125A may be any application, program, process, task, or script. Executable code 125A may be executed by controller 105A possibly under control of operating system 115A. For example, executable code 125A may be, or may execute, one or more applications performing methods as disclosed herein, such as determining the sign of an encrypted ciphertext, or a process providing input to a machine learning model following a comparison between two encrypted ciphertexts. In some embodiments, more than one computing device 100A or components of device 100A may be used. One or more processor(s) 105A may be configured to carry out embodiments of the present invention by for example executing software or code.

Storage 130A may be or may include, for example, a hard disk drive, a floppy disk drive, a compact disk (CD) drive, a universal serial bus (USB) device or other suitable removable and/or fixed storage unit. Data described herein may be stored in a storage 130A and may be loaded from storage 130A into a memory 120A where it may be processed by controller 105A. Storage 130A may include cloud storage. Storage 130A may include storing data in a database.

Input devices 135A may be or may include a mouse, a keyboard, a touch screen or pad or any suitable input device or combination of devices. Output devices 140A may include one or more displays, speakers and/or any other suitable output devices or combination of output devices. Any applicable input/output (I/O) devices may be connected to computing device 100A, for example, a wired or wireless network interface card (NIC), a modem, printer, a universal serial bus (USB) device or external hard drive may be included in input devices 135A and/or output devices 140A.

Embodiments of the invention may include one or more article(s) (e.g., memory 120A or storage 130A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

FIG. 3B is a schematic drawing of a system 100 according to some embodiments of the invention. System 100 may include a system 100 for performing large-precision homomorphic comparison using bootstrapping, according to an embodiment of the invention. The above-described embodiments may be executed using any single or combination of devices and/or components of system 100 of FIG. 3A. The devices of system 100 may be operated by parties including one or more data owner device(s) 140, 150, . . . , one or more host device(s) 110, and one or more database(s) 115. Each party's device(s) 110, 115, 140, and 150, may include one or more server(s), storage device(s), computer(s) such as, personal computers, desktop computers, mobile computers or devices, laptop computers, and notebook computers or any other suitable device such as a cellular telephone, personal digital assistant (PDA), video game console, etc., and may include wired or wireless connections or modems.

In one implementation, host device(s) 110 may include one or more servers, database(s) 115 may include one or more storage devices comprising memory/memories 113, and data owner device(s) 140 and 150 may include one or more computers or mobile devices, such as, smart cellular telephones. Data owner device(s) 140 and 150 may include respective memories 148 and 158 for storing data owner information. Data owner device(s) 140 and 150 may include one or more input devices 142 and 152, respectively, for receiving input from a user, such as, two encrypted numbers. Data owner device(s) 140 and 150 may include one or more output devices 144 and 154 (e.g., a monitor or screen) for displaying data to the data owner provided by or for host device(s) 110.

Database(s) 115 may be a storage device comprising one or more memories 113 to store encrypted data 117, such as, two encrypted numbers. In alternate embodiments, database(s) 115 may be omitted and data owner encrypted information 117 may be stored in an alternate location, e.g., exclusively in memory unit(s) 148 and 158 of the respective entity devices, or in host device memory 118.

Any or all of system 100 devices may be connected via one or more network(s) 120. Network 120 may be any public or private network such as the Internet. Access to network 120 may be through wire line, terrestrial wireless, satellite, or other systems well known in the art.

Each system device 110, 115, 140, and 150 may include one or more controller(s) or processor(s) 116, 111, 146, and 156, respectively, for executing operations according to embodiments of the invention and one or more memory unit(s) 118, 113, 148, and 158, respectively, for storing data (e.g., two encrypted numbers, private keys, public keys, etc.) and/or instructions (e.g., software for applying computations or calculations to the two encrypted numbers, to decrypt data, and other operations according to embodiments of the invention) executable by the processor(s).

Processor(s) 116, 111, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 113, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A computer implemented method for improving homomorphic encryption, the method comprising:
   receiving, at a computer processor, a homomorphically encrypted ciphertext;
   splitting, by the computer processor, the homomorphically encrypted ciphertext into a plurality of smaller digits;
   for each smaller digit of the plurality of smaller digits:
      (i) applying, by the computer processor, a homomorphic floor function to clear a digit of the plurality of smaller digits which corresponds to a least significant bit of the homomorphically encrypted ciphertext;
      (ii) reconstructing, by the computer processor, the homomorphically encrypted ciphertext without the digit of the plurality of smaller digits cleared at (i), and scaling down the reconstructed homomorphically encrypted ciphertext using modulus switching, thereby changing the ciphertext modulus to a new modulus;
   iteratively repeating steps (i) and (ii) until the new modulus is less than or equal to the modulus of the smaller digit under consideration;
   applying, by the processor, a bootstrapping procedure for a sign evaluation function to determine a sign of the scaled down homomorphically encrypted ciphertext;
   transmitting, by the computer processor, the sign with the homomorphically encrypted ciphertext to a server; and
   comparing the homomorphically encrypted ciphertext to another homomorphically encrypted ciphertext by evaluating a difference between the two homomorphically encrypted ciphertexts, and determining a sign of the difference.

2. The method of claim 1, wherein the homomorphic floor function is a negacyclic function.

3. The method of claim 1, wherein applying the homomorphic floor function comprises using a function $f_0(x)$, given by $$f_0(x) = \begin{cases} -q/4, & \text{if } 0 \leq x < q/2 \\ q/4, & \text{otherwise.} \end{cases}$$

4. The method of claim 1, wherein applying the homomorphic floor function comprises using a function $f_1(x)$, given by $$f_1(x) = \begin{cases} x, & \text{if } x < q/2 \\ q/2 - x, & \text{otherwise.} \end{cases}$$

5. The method of claim 1, wherein applying the homomorphic floor function comprises using a function $f_2(x)$, given by $$f_2(x) = \begin{cases} -q/4, & \text{if } 0 \leq x < q/2 \\ q/4, & \text{if } q/2 \leq x < 3q/4 \\ 0, & \text{otherwise.} \end{cases}$$

6. The method of claim 1, wherein the step of applying the homomorphic floor function is implemented by an arbitrary function evaluation using a lookup table for small plaintext moduli which support FHEW bootstrapping.

7. The method of claim 1, wherein the subsequent use comprises applying the transmitted sign and ciphertext to a machine learning decision tree action or neural network inference.

8. The method of claim 1, wherein the encrypted ciphertext corresponds to an integer modulo $Q/\alpha$, and wherein a noise e of the encrypted ciphertext is constrained such that $|e| < \beta$, wherein $\beta \leq \alpha/4$.

9. A system for improving homomorphic encryption, the system comprising at least one processor and a memory containing instructions which, when executed by the at least one processor, cause the at least one processor to:
   receive a homomorphically encrypted ciphertext;
   split the homomorphically encrypted ciphertext into a plurality of smaller digits;
   for each smaller digit of the plurality of smaller digits:
      (i) apply a homomorphic floor function to clear a digit of the plurality of smaller digits which corresponds to a least significant bit of the homomorphically encrypted ciphertext;
      (ii) reconstruct the homomorphically encrypted ciphertext without the digit of the plurality of smaller digits cleared at (i), and scale down the reconstructed homomorphically encrypted ciphertext, using modulus switching, thereby changing the ciphertext modulus to a new modulus;
   iteratively repeat steps (i) and (ii) until the new modulus is less than or equal to the modulus of the smaller digit under consideration;
   apply a bootstrapping procedure for a sign evaluation function to determine a sign of the scaled down homomorphically encrypted ciphertext;

transmit the sign with the homomorphically encrypted ciphertext to a server; and compare the homomorphically encrypted ciphertext to another homomorphically encrypted ciphertext by evaluating a difference between the two homomorphically encrypted ciphertexts, and determining a sign of the difference.

10. The system of claim 9, wherein the homomorphic floor function is a negacyclic function.

11. The system of claim 1 wherein applying the homomorphic floor function comprises using a function $f_0(x)$, given by $$f_0(x) = \begin{cases} -q/4, \text{ if } 0 \le x < q/2 \\ q/4, \text{ otherwise.} \end{cases}$$

12. The system of claim 9, wherein applying the homomorphic floor function comprises using a function $f_1(x)$, given by $$f_1(x) = \begin{cases} x, \text{ if } x < q/2 \\ q/2 - x, \text{ otherwise.} \end{cases}$$

13. The system of claim 9, wherein applying the homomorphic floor function comprises using a function $f_2(x)$, given by $$f_2(x) = \begin{cases} -q/4, \text{ if } 0 \le x < q/2 \\ q/4, \text{ if } q/2 \le x < 3q/4 \\ 0, \text{ otherwise.} \end{cases}$$

14. The system of claim 9, wherein the step of applying the homomorphic floor function is implemented by an arbitrary function evaluation using a lookup table for small plaintext moduli which support FHEW bootstrapping.

15. The system of claim 9, wherein the subsequent use comprises applying the transmitted sign and ciphertext to a machine learning decision tree action or neural network inference.

16. The system of claim 9, wherein the encrypted ciphertext corresponds to an integer modulo $Q/\alpha$, and wherein a noise e of the encrypted ciphertext is constrained such that $|e|<\beta$, wherein $\beta \le \alpha/4$.

17. The system of claim 9, wherein the at least one processor belongs to the server.

18. A computer program product containing a non-transitory computer readable storage medium storing instructions which, when loaded into a computing device comprising at least one processor cause the at least one processor to:

receive a homomorphically encrypted ciphertext;

split the homomorphically encrypted ciphertext into a plurality of smaller digits;

for each smaller digit of the plurality of smaller digits:
  (i) apply a homomorphic floor function to clear a digit of the plurality of smaller digits which corresponds to a least significant bit of the homomorphically encrypted ciphertext;
  (ii) reconstruct the homomorphically encrypted ciphertext without the digit of the plurality of smaller digits cleared at (i), and scale down the reconstructed homomorphically encrypted ciphertext, using modulus switching, thereby changing the ciphertext modulus to a new modulus;

iteratively repeat steps (i) and (ii) until the new modulus is less than or equal to the modulus of the smaller digit under consideration;

apply a bootstrapping procedure for a sign evaluation function to determine a sign of the scaled down homomorphically encrypted ciphertext; and transmit the sign with the homomorphically encrypted ciphertext to a server; and compare the homomorphically encrypted ciphertext to another homomorphically encrypted ciphertext by evaluating a difference between the two homomorphically encrypted ciphertexts, and determining a sign of the difference.

* * * * *